US010830217B2

(12) United States Patent
Naito

(10) Patent No.: US 10,830,217 B2
(45) Date of Patent: Nov. 10, 2020

(54) BINARY POWER GENERATION SYSTEM

(71) Applicant: IHI Corporation, Koto-ku (JP)

(72) Inventor: Toshiyuki Naito, Koto-ku (JP)

(73) Assignee: IHI Corporation, Koto-ku (JP)

( * ) Notice: Subject to any disclaimer, the term of this patent is extended or adjusted under 35 U.S.C. 154(b) by 0 days.

(21) Appl. No.: 16/506,785

(22) Filed: Jul. 9, 2019

(65) Prior Publication Data

US 2019/0331097 A1    Oct. 31, 2019

Related U.S. Application Data

(63) Continuation of application No. PCT/JP2018/003912, filed on Jul. 8, 2018.

(30) Foreign Application Priority Data

Mar. 24, 2017    (JP) .................................. 2017-058570

(51) Int. Cl.
| | |
|---|---|
| F03G 6/06 | (2006.01) |
| F24S 20/20 | (2018.01) |
| F01K 3/18 | (2006.01) |
| F01K 23/02 | (2006.01) |

(52) U.S. Cl.
CPC .............. *F03G 6/064* (2013.01); *F01K 3/185* (2013.01); *F01K 23/02* (2013.01); *F24S 20/20* (2018.05)

(58) Field of Classification Search
CPC .......... F03G 6/064; F24S 20/20; F01K 3/185; F01K 23/02; Y02E 10/46
USPC ............................ 60/641.8–641.15, 655, 660
See application file for complete search history.

(56) References Cited

U.S. PATENT DOCUMENTS

| | | | | |
|---|---|---|---|---|
| 4,195,231 | A | * 3/1980 | Reed | ...................... F01K 23/105 |
| | | | | 290/40 R |
| 4,227,093 | A | * 10/1980 | Uram | ...................... F01D 19/00 |
| | | | | 290/40 R |
| 5,816,048 | A | 10/1998 | Bronicki et al. | |
| 2011/0314818 | A1 | 12/2011 | Breen et al. | |

(Continued)

FOREIGN PATENT DOCUMENTS

| | | |
|---|---|---|
| CN | 105443170 A | 3/2016 |
| EP | 0 007 850 A1 | 2/1980 |

(Continued)

OTHER PUBLICATIONS

International Search Report dated Mar. 13, 2018 in PCT/JP2018/003912 filed Feb. 6, 2018.

*Primary Examiner* — Hoang M Nguyen
(74) *Attorney, Agent, or Firm* — Oblon, McClelland, Maier & Neustadt, L.L.P.

(57) ABSTRACT

Provided are a high-temperature-side loop to which thermal fluid from a thermal line is supplied for power generation, a low-temperature-side loop to which the thermal fluid from the high-temperature-side loop is guided for power generation, a thermal-fluid thermometer to detect a temperature of the thermal fluid supplied to the high-temperature-side loop, and a line switcher to switch, on the basis of the detected temperature of the thermal-fluid thermometer, between a mode where the thermal fluid from the thermal line is supplied through the high-temperature-side loop to the low-temperature-side loop and a mode where the supply of the thermal fluid to the high-temperature-side loop is shut off and the thermal fluid is supplied only to the low-temperature-side loop.

12 Claims, 3 Drawing Sheets

(56) References Cited

U.S. PATENT DOCUMENTS

| | | | |
|---|---|---|---|
| 2012/0174610 A1* | 7/2012 | Takayama | F25B 11/02 |
| | | | 62/196.1 |
| 2013/0025301 A1* | 1/2013 | Maitani | F24D 11/0214 |
| | | | 62/79 |
| 2013/0205778 A1* | 8/2013 | Hansen | F24D 19/1045 |
| | | | 60/641.8 |
| 2016/0169210 A1* | 6/2016 | Mishima | F03G 6/064 |
| | | | 60/641.8 |
| 2016/0237859 A1 | 8/2016 | Malinin et al. | |
| 2018/0119578 A1* | 5/2018 | Zhou | F01K 23/101 |

FOREIGN PATENT DOCUMENTS

| | | |
|---|---|---|
| JP | 55-19985 | 2/1980 |
| JP | 61-132710 | 6/1986 |
| JP | 2013-241865 | 12/2013 |
| JP | 2017-2833 | 1/2017 |

\* cited by examiner

BINARY POWER GENERATION SYSTEM

TECHNICAL FIELD

The present disclosure relates to a binary power generation system using thermal fluid, and especially relates to a binary power generation system adapted to effectively generate power from temperature-varying thermal fluid such as that obtained by solar heat utilization.

BACKGROUND ART

A system of combining a solar heat collecting apparatus with seawater/freshwater equipment has been proposed (Patent Literature 1). In the system disclosed in Patent Literature 1, oil or other heat medium is supplied to and heated by a solar heat collecting apparatus. The heated heat medium is heat-exchanged with water supplied to a steam superheater and resultant steam is supplied to a steam turbine power generation equipment and is used for power generation. The steam discharged from the steam turbine power generation equipment is condensed into water in a steam condenser through cooling by seawater as cooling fluid, and the resultant water is supplied again to the steam superheater.

CITATION LIST

Patent Literature

Patent Literature 1: JP 2017-002833A

SUMMARY

Technical Problems

However, a temperature of the heat medium increased by solar heat in the solar heat collecting apparatus as in Patent Literature 1 may vary largely in response to seasons, weathers and day and night. There is a problem that effective power generation cannot be conducted in such turbine power generation equipment which is said to have difficulty in followability when heat input varies largely.

The present disclosure is made in view of the above problem and is directed to provide a binary power generation system in which, even if a temperature of thermal fluid varies, effective power generation can be conducted depending on the temperature.

Solution to Problems

The present disclosure relates to a binary power generation system comprising a high-temperature-side loop having a first evaporator for evaporating a high-temperature-side heat medium through heat exchange with thermal fluid from a thermal line, a first turbine generator driven by steam from the first evaporator and a first condenser for condensing the steam from the first turbine generator into water through heat exchange with cooling fluid, a low-temperature-side loop having a second evaporator for evaporating a low-temperature-side heat medium through heat exchange with the thermal fluid from the first evaporator, a second turbine generator driven by steam from the second evaporator, and a second condenser for condensing the steam from the second turbine generator into water through heat exchange with the cooling fluid, and a line switcher with a thermal-fluid thermometer to detect a temperature of the thermal fluid for switching, on the basis of the detected temperature of the thermal-fluid thermometer, between a mode where the thermal fluid from the thermal line is supplied through the high-temperature-side loop to the low-temperature-side loop and a mode where the supply of the thermal fluid to the high-temperature-side loop is shut off and the thermal fluid is supplied only to the low-temperature-side loop.

The above-mentioned binary power generation system may further comprise a cooling-fluid-supplying flow passage through which the cooling fluid from the second condenser in the low-temperature-side loop is supplied to the first condenser in the high-temperature-side loop.

In the above-mentioned binary power generation system, the thermal line may be connected to the solar heat collecting apparatus; the first evaporator may be connected to the second evaporator through a communication line; and the second evaporator may be connected to the solar heat collecting apparatus through a return line.

The above-mentioned binary power generation system may further comprise a bypass line between the communication and return lines to bypass the second evaporator and a low-temperature-side-loop stoppage switcher with a cooling-fluid thermometer to detect a temperature of the cooling fluid to the second condenser, and a low-temperature-side-loop stoppage switcher for switching, on the basis of the detected temperature of the cooling-fluid thermometer, between a mode where the thermal fluid in the communication line is guided to the second evaporator and a mode where the thermal fluid in the communication line is guided to the return line by bypassing the second evaporator.

In the above-mentioned binary power generation system, the low-temperature-side heat medium may be ammonia, and the high-temperature-side heat medium may be a fluorocarbon based cooling medium of R245fa (HFC245fa), R1234ze (CF3CH=CHF), R1234zd (CF3CH=CHC) or R152a (HFC152a).

Effects

The binary power generation system according to the present disclosure exhibits an excellent effect that, even if a temperature of the thermal fluid varies, effective power generation can be attained by conducting an operation depending on the temperature.

DESCRIPTION OF EMBODIMENT

An embodiment of a binary power generation system according to the invention will be described in conjunction with FIG. 1.

Figure 1:
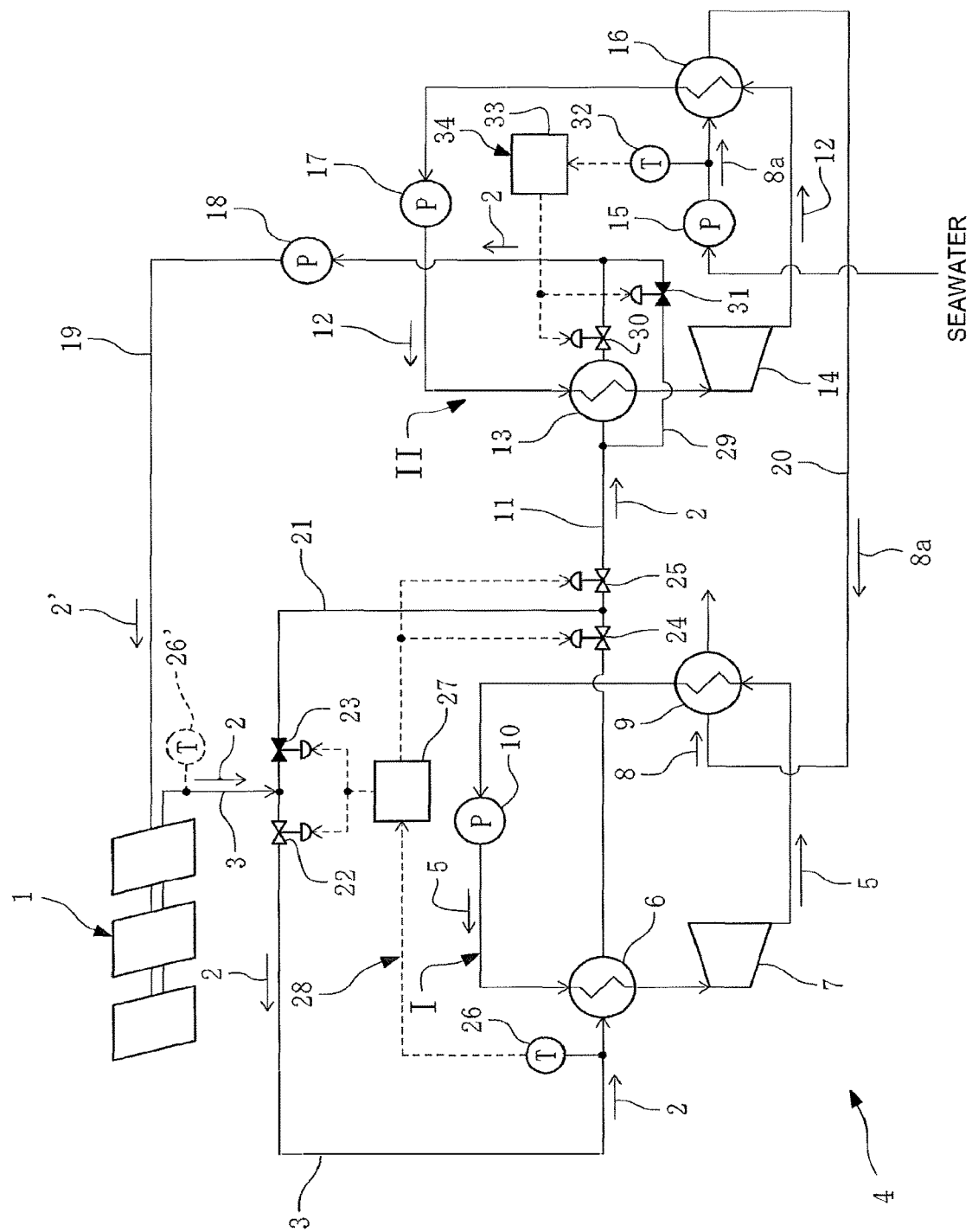
FIG. 1 is a systematic diagram showing an embodiment of a binary power generation system according to the invention and is a diagram of an operation when thermal fluid has a temperature not less than a set temperature.

FIG. 1 shows an example of a binary power generation system using solar heat in which reference numeral 1 denotes a solar heat collecting apparatus. Oil or other heat medium 2' is supplied to the solar heat collecting apparatus 1 and is heated by solar heat. The heated thermal fluid 2 is supplied through a thermal line 3 to a binary power generator 4. The heat medium 2' used is preferably oil or the like which does not rust metal piping or the like, but is not limited thereto; usable are any media capable of recovering solar heat.

The binary power generator 4 comprises high- and low-temperature-side loops I and II.

The high-temperature-side loop I has a first evaporator 6 which evaporates a high-temperature-side heat medium 5 through heat exchange with the thermal fluid 2 from the thermal line 3; a first turbine generator 7 driven by steam from the first evaporator 6; a first condenser 9 which condenses the steam from the first turbine generator 7 into water thorough heat exchange with cooling fluid 8; and a first pump 10 through which the high-temperature-side heat medium 5 liquefied by the condenser 9 is supplied to the first evaporator 6.

The low-temperature-side loop II has a second condenser 13 to which the thermal fluid 2 from the first evaporator 6 is guided through a communication line 11 to evaporate a low-temperature-side heat medium 12 through heat exchange with the thermal fluid 2 from the communication line 11; a second turbine generator 14 driven by steam from the second evaporator 13; a second condenser 16 which condenses the steam from the second turbine generator 14 into water through heat exchange with cooling fluid 8a supplied through a cooling-fluid pump 15; and a second pump 17 through which the low-temperature-side heat medium 12 liquefied by the second condenser 16 is supplied to the second evaporator 13.

The cooling fluid 8a to be supplied to the second condenser 16 may be seawater or river water. In order to stably operate the binary power generation system according to the present disclosure, it is preferable that a temperature of the cooling fluid 8a is as low as possible and is at least lower than 25° C. as lowermost operable temperature. Thus, effectively usable is well water or pumped-up deep sea water.

The thermal fluid 2 from the second evaporator 13 in the low-temperature-side loop II is supplied through a return line 19 with a circulation pump 18 to the solar heat collecting apparatus 1 and is used circulatorily.

The cooling fluid 8a from the second condenser 16 in the low-temperature-side loop II is supplied as cooling fluid 8 through the cooling-fluid-supplying flow passage 20 to the first condenser 9 in the high-temperature-side loop I.

Branched from the thermal line 3 through which the thermal fluid 2 is guided to the first evaporator 6 in the high-temperature-side loop I is a branch line 21 which is communicated with the communication line 11 to the second evaporator 13. The thermal and branch lines 3 and 21 are provided with changeover valves 22 and 23, respectively. The communication line 11 is provided with changeover valves 24 and 25 upstream and downstream of a connection thereof with the branch line 21, respectively.

A thermal-fluid thermometer 26 which detects a temperature of the thermal fluid 2 is arranged in the thermal line 3 at an entrance of the first evaporator 6, and the temperature detected by the thermal-fluid thermometer 26 is inputted to a controller 27 which is arranged to control opening/closing of the changeover valves 22, 23, 24 and 25. The thermal-fluid thermometer 26, the controller 27 and the changeover valves 22, 23, 24 and 25 constitute a line switcher 28. In place of the thermal-fluid thermometer 26 at the entrance of the first evaporator 6, a thermal-fluid thermometer 26' may be arranged in the thermal line 3 at an exit of the solar heat collecting apparatus 1.

Arranged between the communication and return lines 11 and 19 is a bypass line 29 which bypasses the second evaporator 13. Arranged in the communication line 11 at an exit of the second evaporator 13 and in the bypass line 29 are changeover valves 30 and 31, respectively. A cooling-fluid thermometer 32 is arranged to measures a temperature of the cooling fluid 8a to the second condenser 16, and a temperature detected by the thermometer 32 is inputted to a stoppage controller 33 to control opening/closing of the changeover valves 30 and 31. Thus, the cooling-fluid thermometer 32, the stoppage controller 33 and the changeover valves 30 and 31 constitute a low-temperature-side-loop stoppage switcher 34.

The low-temperature-side heat medium 12 used may be ammonia (a boiling point: −33° C). The high-temperature-side heat medium 5 used may be a fluorocarbon based cooling medium, known to have a boiling point higher than that of ammonia, of R245fa (HFC245fa), R1234ze (CF3CH=CHF), R1234zd (CF3CH=CHC) or R152a (HFC152a) in combination with the ammonia.

The present disclosure is based on a concept that power generation is conducted during daytime with increased power consumption. In a case where power generation is conducted also during nighttime, the heat of the thermal fluid 2 heated by the solar heat collecting apparatus 1 during daytime is accumulated by an accumulator, and the heat of the accumulator may be used to conduct power generation during nighttime.

The embodiment is operated as follows.

In FIG. 1, the thermal fluid 2 heated by the solar heat collecting apparatus 1 is supplied to the binary power generator 4 and is used for power generation.

In binary power generation using solar heat, it has been studied to generate power using the thermal and cooling fluids 2 and 8a with temperatures of about 90° C. and about 25° C., respectively. Thus, also in the present disclosure, testing was made with these conditions.

A temperature detected by thermal-fluid thermometer 26 at the entrance of the first evaporator 6 is inputted to the controller 27 which changes into a mode where the thermal fluid 2 is supplied through the high-temperature-side loop I to the low-temperature-side loop II when the temperature detected by the thermal-fluid thermometer 26 is not less than the set temperature of, for example, 90° C., and into a mode where the supply of the thermal fluid 2 to the high-temperature-side loop I is shut off and the thermal fluid 2 is supplied to the low-temperature-side loop II when the temperature detected by the thermometer 26 is less than the set temperature.

Operation when Thermal Fluid to First Evaporator is not Less than Set Temperature When the temperature detected by the thermal fluid thermometer 26 is not less than the set temperature (for example, 90° C.), the controller 27 in the line switcher 28 closes the changeover valve 23 (shown in blacking) and opens the changeover valves 22, 24 and 25 (shown in whitening) as shown in FIG. 1.

The thermal fluid 2 with the temperature of not less than 90° C. from the solar heat collecting apparatus 1 is guided through the thermal line 3 to the first evaporator 6 in the high-temperature-side loop I, whereby power generation is conducted in the high-temperature-side loop I. Then, the thermal fluid 2 robbed of heat in the high-temperature-side loop I into, for example, 50° C. is guided through the communication line 11 to the second evaporator 13 in the low-temperature-side loop II, whereby power is generated also in the low-temperature-side loop II.

In this case, the cooling fluid 8a of, for example, 15° C. is supplied to the second condenser 16 to liquefy the low-temperature-side heat medium 12; then, the cooling fluid 8a elevated in temperature into, for example, 25° C. through heat exchange in the second condenser 16 is supplied as cooling fluid 8 through the cooling-fluid-supplying flow passage 20 to the first condenser 9 in the high-temperature-side loop I to liquefy the high-temperature-side heat medium 5.

Thus, when the thermal fluid 2 with the temperature of not less than 90° C. is obtained by the solar heat collecting apparatus 1, power can be effectively generated by both of the high- and low-temperature-side loops I and II.

Operation when Thermal Fluid to First Evaporator is Less than Set Temperature

Figure 2:
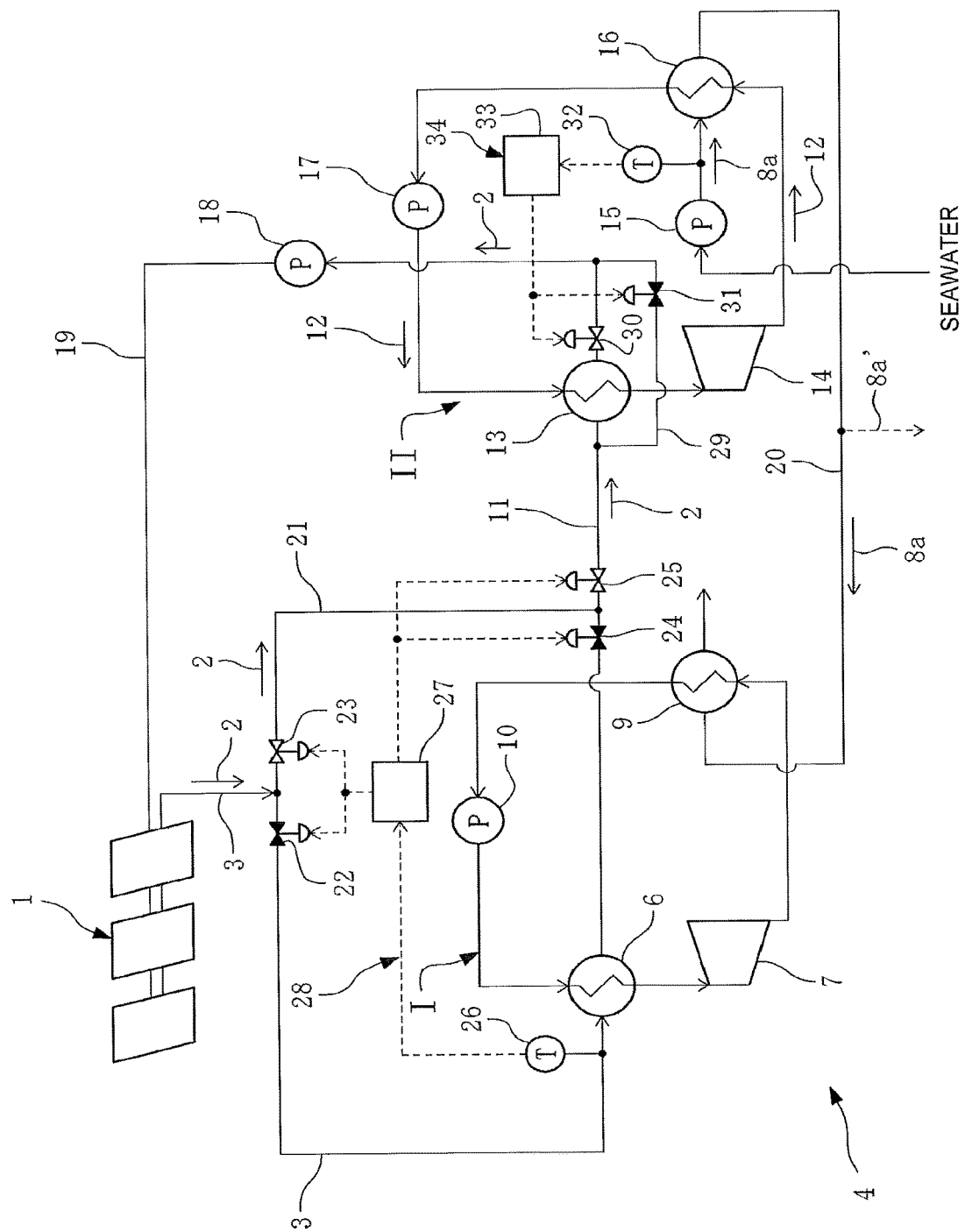
FIG. 2 is a diagram of an operation when the thermal fluid has a temperature less than the set temperature.

When the temperature detected by the thermal fluid thermometer 26 is less than the set temperature of, for example, 90° C., the controller 27 in the line switcher 28 closes the changeover valves 22 and 24 (shown in blackening) and opens the changeover valves 23 and 25 (shown in whitening) as shown in FIG. 2.

The thermal fluid 2 with the temperature of less than 90° C. from the solar heat collecting apparatus 1 is guided through the branch line 21 to the second evaporator 13 in the low-temperature-side loop II, whereby power is generated in the low-temperature-side loop II. In this case, the cooling fluid 8a with the temperature of, for example, 15° C. is supplied to the second condenser 16 to liquefy the low-temperature-side heat medium 12, so that power can be effectively generated using the thermal fluid with the temperature less than 90° C. In this case, when the temperature of the thermal fluid 2 is down to, for example, about 40° C., which is enough for power generation due to temperature difference with the cooling fluid 8a supplied to the second condenser 16 in the low-temperature-side loop II, power can be generated in the low-temperature-side loop II.

In FIG. 2, since power generation by the high-temperature-side loop I is shut off, load on the cooling fluid pump 15 may be reduced by discharging outside the cooling fluid 8a from the second condenser 16 as discharged cooling fluid 8a' as shown in dotted lines.

Operation When Temperature of Cooling Fluid to Second Condenser is Higher than Lowermost Operable Temperature When the temperature of the cooling fluid 8a to the second condenser 16 is higher than the lowermost operable temperature of, for example, 25° C., power generation in the low-temperature-side loop II becomes impossible if the temperature of the thermal fluid 2 supplied from the high-temperature-side loop I to the low-temperature-side loop II is less than, for example, 50° C.

Figure 3:
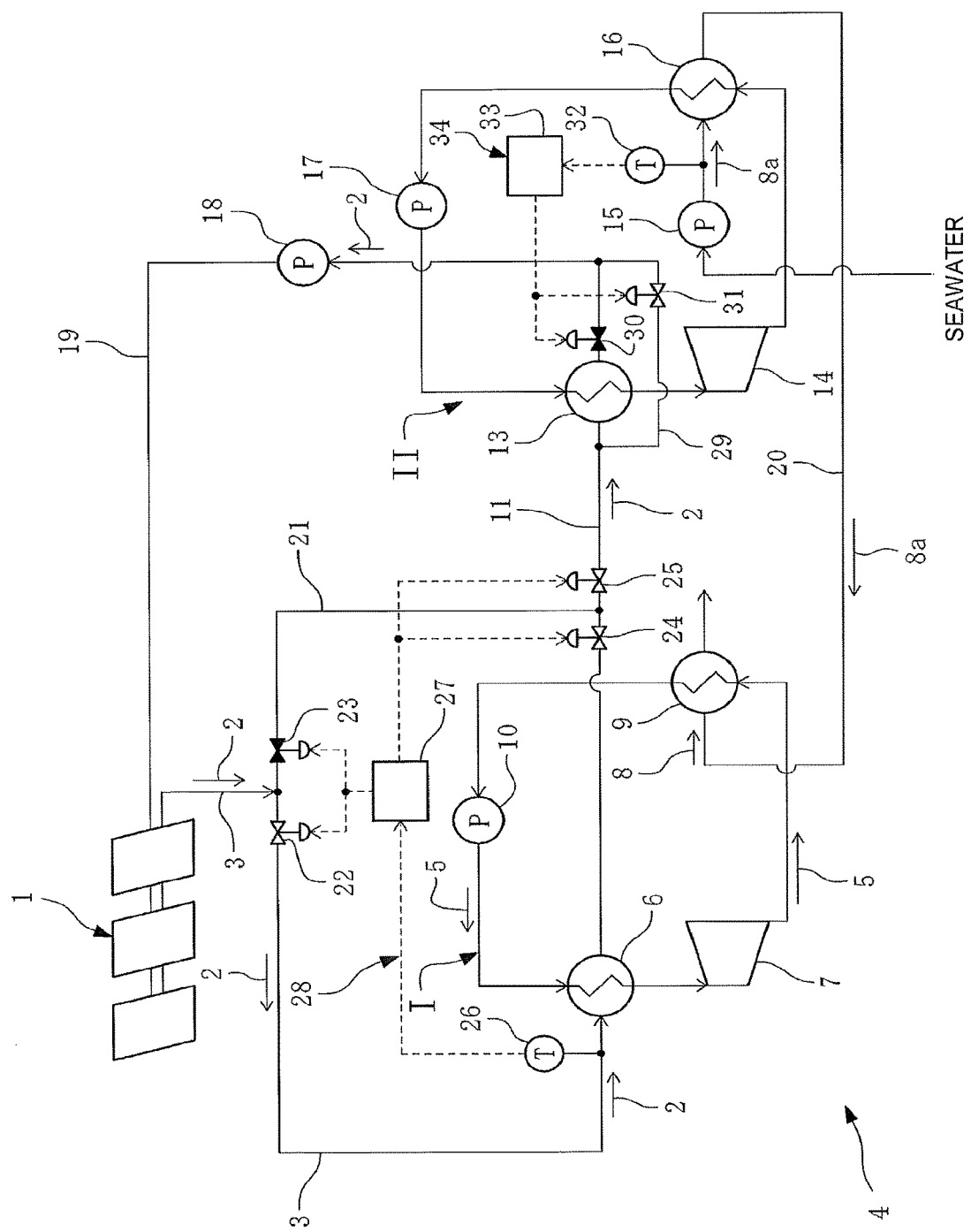
FIG. 3 is a diagram of an operation when cooling fluid to a second condenser has a temperature higher than a lowermost operable temperature.

Thus, when the temperature detected by the cooling fluid thermometer 32 is higher than 25° C., the stoppage controller 33 in the low-temperature-side-loop stoppage switcher 34 closes the changeover valve 30 (shown in blacking) and open the changeover valve 31 (shown in whitening) on the basis of the detected temperature as shown in FIG. 3, so that the thermal fluid 2 is guided to the bypass line 29 and is caused to flow to the return line 19 by bypassing the second evaporator 13. Thus, even if the thermal fluid 2 from the solar heat collecting apparatus 1 is not less than 90° C. to conduct power generation in the high-temperature-side loop I and the temperature of the thermal fluid 2 supplied from the high-temperature-side loop I to the low-temperature-side loop II is, for example, 50° C., the power generation in the low-temperature-side loop II is shut off if the temperature of the cooling fluid 8a to the second condenser 16 is higher than the lowermost operable temperature.

In the above embodiment, explanation has been made on a case where power generation is conducted using the thermal fluid 2 comprising heat medium 2' heated in the solar heat collecting apparatus 1 by solar heat, which may be similarly applied to cases where plant exhaust fluid, source of spring, used hot-spring fluid and the like are used as thermal fluid.

Provided in the above-mentioned embodiment are high- and low-temperature-side loops I and II and the line switcher 28 which changes between the case where the thermal fluid 2 from the thermal line 3 is supplied through the high-temperature-side loop I to the low-temperature-side loop II and the case where the supply of the thermal fluid 2 to the high-temperature-side loop I is shut off and the thermal fluid 2 is supplied only to the low-temperature-side loop II. Thus, even if the temperature of the thermal fluid 2 varies, effective power generation can be conducted by an operation depending on the temperature.

The cooling-fluid-supplying flow passage 20 is provided to supply the cooling fluid 8a from the second condenser 16 in the low-temperature-side loop II to the first condenser 9 in the high-temperature-side loop I, which makes it possible to effectively utilize the cooling fluid 8a and to drive the same with the single cooling fluid pump 15, leading to the simplified equipment.

The thermal line 3 is connected to the solar heat collecting apparatus 1; the first evaporator 6 is connected to the second evaporator 13 through the communication line 11; and the second evaporator 13 is connected to the solar heat collecting apparatus 1 through the return line 19. Thus, the thermal fluid 2 comprising the heat medium 2' can be used circulatorily, and the circulation can be made by the single circulation pump 18.

Arranged are the bypass line 29 to bypass the second evaporator 13 and the low-temperature-side-loop stoppage switcher 34 which switches, on the basis of the temperature detected by the cooling-fluid thermometer 32 at the entrance of the second condenser 16, between the mode where the thermal fluid 2 in the communication line 11 is guided to the second evaporator 13 and the mode where the thermal fluid 2 in the communication line 11 is guided to the return line 19 by bypassing the second evaporator 13. Thus, when the cooling fluid 8a to the second condenser 16 has the temperature higher than the lowermost operable temperature, power generation in the low-temperature-side loop II is shut off.

The low-temperature-side heat medium 12 used is ammonia, and the high-temperature-side heat medium 5 used is a fluorocarbon based cooling medium of R245fa (HFC245fa), R1234ze (CF3CH=CHF), R1234zd (CF3CH=CHC) or R152a (HFC152a) in combination with the ammonia, so that power generation can be effectively conducted by the high- and low-temperature-side loops I and II.

It is to be understood that a binary power generation system according to the invention is not limited to the above embodiment and that various changes and modifications may be made without departing from the scope of the invention.

REFERENCE SIGNS LIST 1 solar heat collecting apparatus
2 thermal fluid
3 thermal line
4 binary power generator
5 high-temperature-side heat medium
6 first evaporator
7 first turbine generator
8 cooling fluid
8a cooling fluid
9 first condenser
10 first pump
11 communication line
12 low-temperature-side heat medium
13 second evaporator
14 second turbine generator
16 second condenser
17 second pump
18 circulation pump
19 return line
20 cooling-fluid-supplying flow passage
21 branch line
26 thermal fluid thermometer
27 controller
28 line switcher
29 bypass line
32 cooling fluid thermometer
33 stoppage controller
34 low-temperature-side-loop stoppage switcher
I high-temperature-side loop
II low-temperature-side loop

The invention claimed is:

1. A binary power generation system comprising
a high-temperature-side loop having a first evaporator for evaporating high-temperature-side heat medium through heat exchange with thermal fluid from a thermal line, a first turbine generator driven by steam from the first evaporator and a first condenser for condensing steam from the first turbine generator into water through heat exchange with cooling fluid,
a low-temperature-side loop having a second evaporator for evaporating a low-temperature-side heat medium through heat exchange with the thermal fluid from the first evaporator, a second turbine generator driven by steam from the second evaporator, and a second condenser for condensing steam from the second turbine generator into water through heat exchange with the cooling fluid, and
a line switcher with a thermal-fluid thermometer to detect a temperature of the thermal fluid for switching, on the basis of the detected temperature of the thermal-fluid thermometer, between a mode where the thermal fluid from the thermal line is supplied through the high-temperature-side loop to the low-temperature-side loop and a mode where the supply of the thermal fluid to the high-temperature-side loop is shut off and the thermal fluid is supplied only to the low-temperature-side loop.

2. The binary power generation system as claimed in claim 1 further comprising a cooling-fluid-supplying flow passage through which the cooling fluid from the second condenser in the low-temperature-side loop is supplied to the first condenser in the high-temperature-side loop.

3. The binary power generation system as claimed in claim 1 wherein the thermal line is connected to a solar heat collecting apparatus, the first evaporator being connected to the second evaporator through a communication line, the second evaporator being connected to the solar heat collecting apparatus through a return line.

4. The binary power generation system as claimed in claim 2 wherein the thermal line is connected to a solar heat collecting apparatus, the first evaporator being connected to the second evaporator through a communication line, the second evaporator being connected to the solar heat collecting apparatus through a return line.

5. The binary power generation system as claimed in claim 3 further comprising
a bypass line between the communication and return lines to bypass the second evaporator and
a low-temperature-side-loop stoppage switcher with a cooling-fluid thermometer to detect a temperature of the cooling fluid to the second condenser for switching, on the basis of the detected temperature of the cooling-fluid thermometer, between a mode where the thermal fluid in the communication line is guided to the second evaporator and a mode where the thermal fluid in the communication line is guided to the return line by bypassing the second evaporator.

6. The binary power generation system as claimed in claim 4 further comprising
a bypass line between the communication and return lines to bypass the second evaporator and
a low-temperature-side-loop stoppage switcher with a cooling-fluid thermometer to detect a temperature of the cooling fluid to the second condenser for switching, on the basis of the detected temperature of the cooling-fluid thermometer, between a mode where the thermal fluid in the communication line is guided to the second evaporator and a mode where the thermal fluid in the communication line is guided to the return line by bypassing the second evaporator.

7. The binary power generation system as claimed in claim 1 wherein the low-temperature-side heat medium is ammonia, and the high-temperature-side heat medium is a fluorocarbon based cooling medium of R245fa (HFC245fa), R1234ze (CF3CH=CHF), R1234zd (CF3CH=CHC) or R152a (HFC152a).

8. The binary power generation system as claimed in claim 2 wherein the low-temperature-side heat medium is ammonia, and the high-temperature-side heat medium is a fluorocarbon based cooling medium of R245fa (HFC245fa), R1234ze (CF3CH=CHF), R1234zd (CF3CH=CHC) or R152a (HFC152a).

9. The binary power generation system as claimed in claim 3, wherein the low-temperature-side heat medium is ammonia, and the high-temperature-side heat medium is a fluorocarbon based cooling medium of R245fa (HFC245fa), R1234ze (CF3CH=CHF), R1234zd (CF3CH=CHC) or R152a (HFC152a).

10. The binary power generation system as claimed in claim 4, wherein the low-temperature-side heat medium is ammonia, and the high-temperature-side heat medium is a fluorocarbon based cooling medium of R245fa (HFC245fa), R1234ze (CF3CH=CHF), R1234zd (CF3CH=CHC) or R152a (HFC152a).

11. The binary power generation system as claimed in claim 5 wherein the low-temperature-side heat medium is ammonia, and the high-temperature-side heat medium is a fluorocarbon based cooling medium of R245fa (HFC245fa), R1234ze (CF3CH=CHF), R1234zd (CF3CH=CHC) or R152a (HFC152a).

12. The binary power generation system as claimed in claim 6 wherein the low-temperature-side heat medium is ammonia, and the high-temperature-side heat medium is a fluorocarbon based cooling medium of R245fa (HFC245fa), R1234ze (CF3CH=CHF), R1234zd (CF3CH=CHC) or R152a (HFC152a).

\* \* \* \* \*